United States Patent [19]
Platoff et al.

[11] Patent Number: 5,276,880
[45] Date of Patent: Jan. 4, 1994

[54] METHOD FOR PARSING AND REPRESENTING MULTI-VERSIONED COMPUTER PROGRAMS, FOR SIMULTANEOUS AND SYNCHRONOUS PROCESSING OF THE PLURAL PARSES

[75] Inventors: Michael A. Platoff, Monmouth Junction; Michael E. Wagner, Hopewell Township, Mercer County, both of N.J.

[73] Assignee: Siemens Corporate Research, Inc., Princeton, N.J.

[21] Appl. No.: 451,493

[22] Filed: Dec. 15, 1989

[51] Int. Cl.⁵ .............................................. G06F 9/45
[52] U.S. Cl. .................................... 395/700; 364/280; 364/280.4; 364/280.5; 364/DIG. 1
[58] Field of Search ...................... 364/DIG.; 395/700

[56] References Cited

U.S. PATENT DOCUMENTS

| | | | |
|---|---|---|---|
| 5,050,068 | 9/1991 | Dollas et al. | 395/375 |
| 5,105,353 | 4/1992 | Charles et al. | 395/700 |
| 5,151,991 | 9/1992 | Iwasawa et al. | 395/700 |

FOREIGN PATENT DOCUMENTS 0343883 11/1989 European Pat. Off.

OTHER PUBLICATIONS

"The Theory and Practice of Compiler Writing", Tremblay et al., McGraw-Hill Book Company, pp. 1-13.
"Using Tomorrow's C Standard Today", Williams et al., Computer Language, Jul. 1988, vol. 5, pp. 49-54.
"A Coroutine Approach to Parsing", Hanan Samet, ACM Transactions on Programming Languages and Systems, vol. 2, No. 3, Jul. 1980, pp. 290-306.
Patent Abstracts of Japan, vol. 9, No. 214 (P-384) Aug. 31, 1985 & JP-A-60 074 039 (Fujitsu K. K.) Apr. 26, 1985.
"Bilingual Mapping Macro", T. L. Oliver, IBM Technical Disclosure Bulletin, vol. 13, No. 10, Mar. 1971, p. 2903.

Primary Examiner—Thomas C. Lee
Assistant Examiner—Maria N. Von Buhr
Attorney, Agent, or Firm—Adel A. Ahmed

[57] ABSTRACT

A modified parser generator enables the parsing of programs such as C programs with preprocessor directives and implemented extensions to the normal abstract syntax tree representation of programs to create an integrated representation structure.

21 Claims, 3 Drawing Sheets

METHOD FOR PARSING AND REPRESENTING MULTI-VERSIONED COMPUTER PROGRAMS, FOR SIMULTANEOUS AND SYNCHRONOUS PROCESSING OF THE PLURAL PARSES

FIELD OF THE INVENTION

The present invention relates to parsing programs and more particularly to parsing and representing computer programs.

BACKGROUND OF THE INVENTION

The present invention is more particularly useful where the programming language has a relatively loosely integrated macro processor. While the invention is not restricted to any specific language, it will be useful in the present explanation to use the C language as an illustratory example of a language having such a loosely integrated macro processor.

One well-known shortcoming of the C programming language is the poor integration of its macro preprocessor with the C grammar. This presents many problems to C language tools such as structure editors, view-oriented program browsers, or program transformation tools that try to integrate the syntax and semantics of the preprocessor directives within the underlying program structure.

Program databases, used in integrated programming support environments, must contain all of the original information found in the program text in order to present complete structural information to a programmer. In many of these environments, the syntax and semantics of programs are commonly represented with attributed abstract syntax trees (AST's). AST's are easy to generate and manipulate and conveniently reflect the structure of the programs they represent. However, for the case of C, AST's are not sufficient. The C preprocessor (cpp), which provides conditional compilation and macro substitution, supports features that cannot be described by a tree-structured representation and are not amenable to existing parsing techniques. For instance, a program containing a single #if is actually two programs: one where the controlling expression is true and the other where it is false. Much information is removed by cpp that the parser has no chance of recovering. However, even if the parser had access to this information, it would be difficult to concisely represent these two views of the program with a single AST. Thus a forest of AST's or, more compactly, a single abstract syntax graph (ASG) is needed for the representation. In most C language compilers and tools, programs are first processed by a macro preprocessor. The resulting text is then passed through a lexical and syntax analysis phase. In many respects, this preprocessor has contributed to C's power as a systems programming language. The following list of preprocessor directives points out the power of the preprocessor and also illustrates some of the resulting difficulties posed by them:

define name token-string

Replace subsequent instances of name with token-string.

define name(arg [,arg]...) token-string

Define a parameterized macro. Macro definitions include a macro body and, optionally, a sequence of formal parameters. A macro body definition is an arbitrary sequence of tokens. Within a macro body, parameters are replaced by the actual arguments of the macro at the use site.

include "file name"

Include the text of one file within another file. This directive is most often used to import interface information from other modules.

if constant-expression

Conditionally include or exclude selected portions of text from a source file. The #if directive evaluates the constant expression and includes the text of its body up to the matching #else, #elif, or #endif, if the expression is true. These features are widely used to construct modules that are portable across different operating systems and machine architectures. This feature also allows the conditional inclusion of various features within a module.

ifdef name

Similar to the #if statement, except that the intervening text between the next #else, #elif, or #endif is included if name has already been defined.

Various problems arise with the integration of the preprocessor with the syntax analysis phase. For example, the preprocessor's grammar is not integrated with the C grammar and since the preprocessor tokens can appear anyplace in a string of C program tokens, the two grammars cannot be combined. Furthermore, conditional compilation directives induce multiple parse trees, or versions, of the same module. Ideally, the syntactic and semantic information of these induced versions should be represented in one integrated program representation structure. In an integrated program representation structure, macro uses should be accessible simply as macros, similar in syntax to identifiers or function calls, as well as in their expanded forms. Another problem arises because the body of a macro definition is not required to be a complete syntactic unit in the underlying C grammar. Also, the text of an included file presents difficulties because the text is not required to be syntactically complete, thus a syntactic unit can span multiple files.

SUMMARY OF THE INVENTION

In accordance with an aspect of the invention, a modified parser generator enables the parsing of programs such as C programs with preprocessor directives and implements extensions to the normal abstract syntax tree representation of programs to create an integrated representation structure.

In accordance with another aspect of the invention, a parser generator is used to generate a parser, for programming languages such as C, that integrates preprocessor directives. Extensions to the normal abstract syntax tree representation of programs are also used to create an integrated structure.

In accordance with yet another aspect of the invention, a method for parsing a computer program text containing conditional compilation directives that induce multiple versions of a program from a single text source comprises:

Multiplexing and synchronizing a plurality of concurrently active parse procedures reading from a common input stream;

Forking a new parse when a conditional compilation directive appears in the input stream, indicating that the input immediately following is one variant of a potential plurality of variants of the program, (the forking being hereinafter referred to as a ParseFork operation);

Exchanging a parse that is associated with one path of the conditional compilation directive with the parse associated with the other branch of the conditional compilation directive, (the exchanging being hereinafter referred to as a ParseExchange operation);

Joining two previously forked parses when a predetermined set of join criteria is met, (the joining being hereinafter referred to as a ParseJoin operation); and scheduling the order of shift-reduce actions in the parses having been synchronized.

In accordance with still another aspect of the invention, forking a new parse when a conditional compilation directive appears in the input stream is performed by copying the current parse state and retaining that state for the purposes of executing more than one parse on the input stream and later determining when two parses are in a state to be joined together.

In accordance with yet another aspect of the invention, two previously forked parses are heuristically scheduled to undergo reductions to attempt to join two parses in a least possible number of shift-reduce actions.

In accordance with a further aspect of the invention, each parse has a state stack and a value stack that are synchronized with each other and wherein if the appropriate #endif has been seen and the forked parses have equal state stacks and no values stored on the value stack will be lost as the result of the join, then the join criteria is met and, in that case, a join is made, with no loss of information resulting.

In accordance with still a further aspect of the invention, the procedures mentioned above in a method of parsing a program respectively comprise:

while there exists a new input token:
  i. get the next input token;
  ii. change all parses that were blocked on input and make them available to process the new input token;
  iii. while there are parses available to act on the current input,
    A. select the next available parse for processing by performing:
    B. if action[CurState, token]=shift s, then push s on the state stack and block this parse until all parses have used the current input token;
    C. if action[CurState, token]=reduce A→β, then reduce A→β:
      1. for each grammar symbol in the string β, pop an element off of the state stack;
      2. if a parse join is pending and the two parses involved meet the join criteria, then join the two parses;
      3. set CurState to Goto[CurState, A] and push CurState on the state-stack;
    D. if action[CurState, token]=accept, then parse is complete; and
    E. if action[CurState, token]=error, then discard this parse.

In accordance with yet a further aspect of the invention, the join criteria are defined such that, if p and p' be two forked parses, f and f be the current pointers to the highest point in the state stack that the two parses have in common from when they were forked, if t and t' be the current pointers to the top of the state stacks for the two parses, respectively, and if $s_1 s_2 \ldots s_f \ldots s_t$ be one state stack, $s'_1 s'_2 \ldots s'_f \ldots s'_{t'}$, be the other state stack, then if the following Criteria is met immediately following a reduction, then two parses can the corresponding #endif has been seen;
$f = f$;
$s_{f+1} = s'_{f+1}$;
$t = f+1$; and
$t' = f+1$.

The invention will next be described by way of an exemplary embodiment with the aid of the drawing, in which

DETAILED DESCRIPTION OF THE PREFERRED EMBODIMENTS

Figure 1:
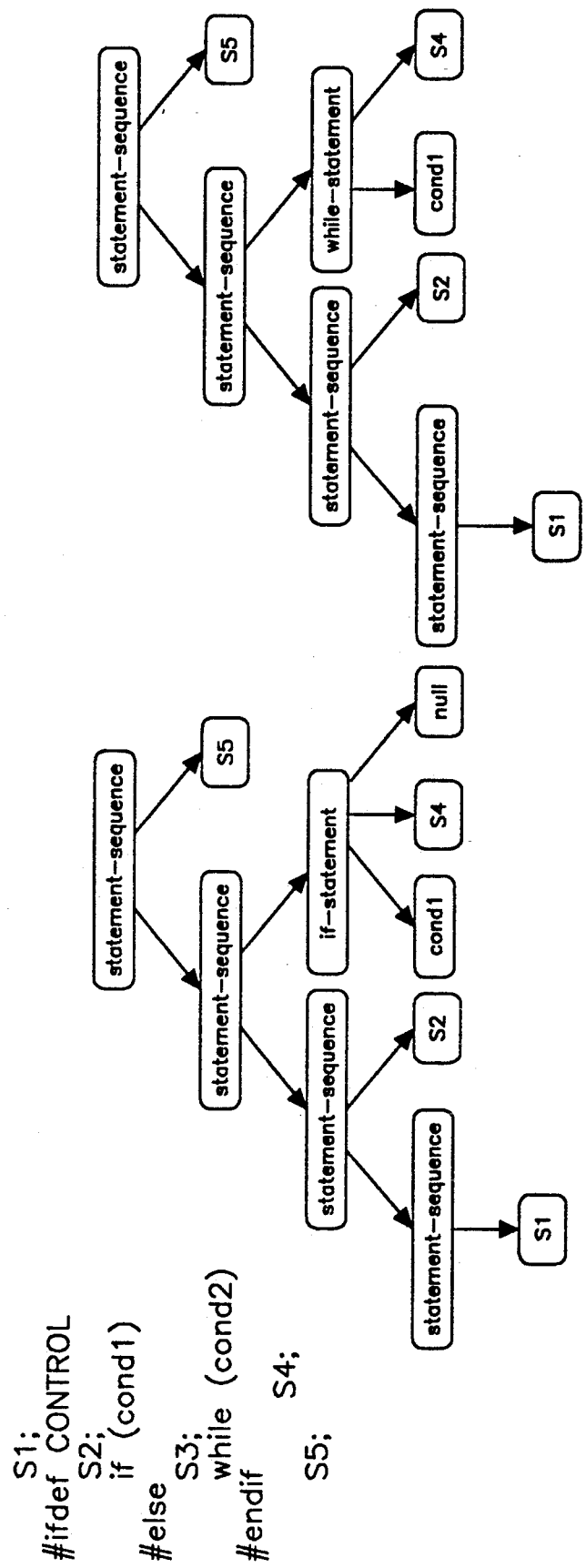
FIG. 1 illustrates a fragment of a C program with conditional compilation and the AST's resulting when the preprocessor symbol CONTROL is and is not defined.

It is herein recognized that since conditional compilation directives induce multiple versions within one program module, techniques are required to parse multiple versions of a module and to represent those multiple versions within one structure. In the exemplary embodiment to be described, parsing multiple versions of a module uses an LALR parser generator and extends that common parsing model.

In accordance with the exemplary embodiment of the present invention, the LALR module was selected due to: the generality of the shift-reduce parser model; the proliferation of C-oriented tools constructed with parser generators such as S. C. Johnson, Yacc: Yet another compiler compiler. Technical Report 32, AT&T Bell Laboratories, Murray Hill, N.J., 1975 and Charles Donnelly and Richard Stallman. Bison, the YACC-compatible Purser Generator. Free Software Foundation, gnu (copyright) prep. air. mit. edu. 1988; Cambridge, Mass. and the requirement to be able to retrofit those tools to handle the preprocessor; and the locality of the parsing code, which offered a cleanly partitioned solution.

To handle conditional compilation in the present model, an LALR parser driver is modified to provide concurrent synchronous parsing of a single stream of tokens. The enhanced parsing model includes the three following operations, each with an associated application specific call-back routine, which in the present embodiment, are used to build the abstract syntax graphs:

ParseFork: fork a new parse when an #ifdef, #ifndef, or #if is seen in the token stream. The fork operation copies the existing parser state, which includes the parser state stack and value stacks. The input pointer is shared by all parses. ParseJoin: try to join two parses when an #endif is encountered in the token stream. Two branches of a parse cannot always be immediately joined because the parses may not meet the join criteria; therefore, parses are scheduled to be joined according to a set of specified join criteria. When parses are scheduled to be joined, multiple parses remain active (reading from a common input stream) until the parses can be joined. In this case, the call-back routine is not actually invoked until the join occurs. Parse scheduling is one of the more difficult problems encountered and will be discussed further hereinbelow. ParseExchange: exchange two branches of a forked parse. This operation occurs when a #else or #elif is encountered in the token stream. The currently executing parses are put to sleep and the parses currently sleeping on the #else or #elif are awakened and scheduled to receive tokens.

The parsing algorithm is an adaption of a standard LALR parsing algorithm, modified to handle multiple parses on a single input stream. The algorithm is presented below as two procedures: a parse scheduler and a modified state machine driver.

The parse scheduler multiplexes the input stream and determines which parse to run through the LALR state machine. The state of each parse is maintained in a scheduler state variable. These states are described below:

Active: signifies that the parse is allowed to receive the current token o the token input stream.

BlockedOnInput: signifies that the current token has already been seen by the parse and that the parse can perform no further work because other active parse are still waiting to process the current token.

Sleeping: signifies that a parse has been put to sleep because it is not interested in the current token stream. This occurs when one branch of a conditional compilation directive is being processed and the other branch is waiting for the corresponding #else or #endif directive to be scheduled.

A major component of the Parse Scheduler and the Modified LALR driver is a mechanism and a set of criteria for joining two forked parses. At each fork point, a pointer to the top of the state stack is retained. This pointer points to the last state that the two parses had in common before they were forked. Therefore, while a #endif or join is pending, if a reduction is made that reduces the state-stack below the point at which a fork was made, the pointer must be updated to reflect the new location in the stack that the two parses had in common. The stack of these pointers is used to handle nested conditional compilation directives.

A set of criteria is utilized for safely joining two forked parses. Each parse has a state-stack and a value stack, used by action routines, that are synchronized with each other. Two parses can be safely joined when there is no loss of information by joining the two parses. That is, the parses can be joined when they have equal state stacks and when no values stored on the value stack will be lost as a result of the join.

The Safe Join Criteria are analyzed as follows: Let p and p' be two forked parses and let f and f' be the current pointers to the highest point in the state-stack that the two parses have in common from when they were forked. Also, let t and t' be the current pointers to the top of the state stacks for the two parses, respectively. Finally, let $s_1 s_2 \ldots s_f \ldots s_t$ be one state-stack, $s'_1 s'_2 \ldots s'_f \ldots s'_{t'}$ be the other state-stack. Let $v_1 v_2 \ldots v_f \ldots v_t$ be one value state-stack and $v'_1 v'_2 \ldots v'_f \ldots v'_{t'}$ be the other. If the following set of criteria is met immediately following a reduction, then two parses can be joined:

1. The corresponding #endif has been seen.
2. $f = f'$.
3. $s_{f+1} = s'_{f+1}$
4. $t = f + 1$
5. $t' = f' + 1$ An informal proof is as follows: Point 1 is required by definition.

Points 2 and 3 establish the equality of two parses from the bottom of each stack up to $s_f$ and $S'_f$. Remember that f and f' always keep track of the highest point in the stack that two parses have in common. This invariant is maintained throughout the life of two forked parses by setting f to t when two parses are forked and by potentially adjusting f to $t-1$ for each parse immediately after a reduction is made. Consequently, by points 2 and 3, the two stacks are equivalent in positions $1 \ldots f+1$. Since the two parses thereafter read from a common input stream, the two parses will now transit through the same states in the future.

Points 4 and 5 guarantee that there is one value on each value-stack above their common parts. Since a join is created by coalescing those values into one join value, no information has been lost.

The above conditions are sufficient and are believed to be necessary.

The processing steps are as follows:

1. Create an initial parse and set it to the BlockedOnInput state.
2. While parses remain:
   (a) If there are no active parses (i.e. all parses have seen the current token), then read the next token and change all parse that are in the BlockedOnInput state to the Active state.
   (b) While the current token is a preprocessor token:
      i. If the current token is a #if, #ifdef, or #ifndef, then the current top of the state stack is recorded for each active parse by pushing a pointer to the current top of the state-stack onto the ForkPtrStack. This is used later to determine when the two parses can be joined together. The parses are then copied and the copied parses are put in the Sleeping state.
      ii. If the current token is a #else, the ForkExchange operation is invoked. Active parses are put to sleep and the parses that are sleeping on this #else are made active.
      iii. If the current token is a #endif, then we activate the parses that are sleeping on this #endif. An attempt is then made to try to join the two previously forked parses. Two parses may be joined when the safe join criteria are met. If the two parses cannot be joined because they are in different configurations, then the scheduler notes that a join is pending. When a join is actually made, one value is popped off of ForkPtrStack, and one of the parses is discarded.
      iv. Get the next token.
   (c) Finally, the scheduler selects the active parse with the highest state stack and runs the selected parse through one iteration of the LALR state-machine driver, as presented below.

In step 2C, the goal is to join two parses together as soon as possible to minimize the differences between two branches of a conditional compilation directive. Since a parse may be in a state where it can be consecutively reduced without an intervening shift, care is taken to schedule reductions in parses in a heuristically determined order to provide the earliest opportunity to join two parses. This heuristic, which happens to work very well for the subject exemplary embodiment using the C grammar, selects the parse with the deepest state-stack. If two state-stacks have equal height, the least recently scheduled parse is selected. This strategy brings the state-stack of the selected parse closer to the level of state-stacks of the other active parses and obviates the need for parse reduction planning, which would be required to find the optimal reduction strategy.

The Modified State-Machine Driver

This procedure is invoked from the Parse Scheduler to run the selected parse through one iteration of the shift-reduce process. The LALR state machine driver is adapted from Aho, Sethi, and Ullman, Compilers: Principles, Techniques, and Tools: Addison-Wesley, Reading, Mass., 1986, with the exception that the state stack only contains states, and the state-machine driver acts on the currently selected parse. The algorithm follows:

1. If action[CurState,token]=shift s, then push s on the state stack and change the state from Active to BlockedOnInput.
2. If action[CurState,token]=reduce A→β, then reduce A→β. The reduction has been slightly modified to handle joining multiple parses:
   (a) For each grammar symbol in the string β, pop an element off of the state stack.
   (b) If a join is pending and the height of the state-stack is below the value stored at the top of the ForkPtrStack, update the pointer stored at the top of ForkPtrStack to reflect the current top of the state-stack.
   (c) If a parse join is pending and the two parses meet the safe join criteria, then join them. Once the join is made, pop the most recent value off of ForkPtrStack.
   (d) Set CurState to Goto[CurState,A] and push CurState on the state-stack.
3. If action CurState,token]=accept, then parse is complete.
4. If action[CurState,token]=error, then discard this parse.

REPRESENTING REAL C PROGRAMS

Parsing C programs while maintaining the preprocessor information is only half of the problem. The other half is representing this information in an AST. The most difficult aspect of this is the trouble introduced by conditional compilation. As shown in FIG. 1, conditional compilation results in multiple versions of a program from a single source text. A simple approach to representing these versions is to have a node in the AST that represents the conditionally compiled code. The node would have two subtrees as its children, one for each alternative of an #ifdef. These subtrees would be created by the forked parses as they run and the ParseJoin operation would create the join node and link it with its children. However, this is not as simple as it appears; the following problems arise:

- Since an LALR parser is used, reductions and the corresponding action routines, are executed in a bottom up fashion, generating a parse with a right-most derivation in reverse. To make matters more difficult, the implementation encourages writing grammar rules in a "left recursive" form, e.g.,
  list : item
        list ',' item
        ;
  This leads to a problem when attempting to join trees that have common predecessors. For instance, if a statement sequence with ten elements has the last statement conditionally compiled, the two syntax trees will be copies of a subtree representing the first nine statements of the sequence. Clearly this repetition is wasteful.
- Similarly, an arbitrary amount of code after a #endif may be duplicated in the children of the join node. This code is needed to complete syntactic units which were started inside the #ifdef. The statement S4 in FIG. 1 illustrates this. Replicating this code would inaccurately represent what was conditionally complied.

Figure 2:
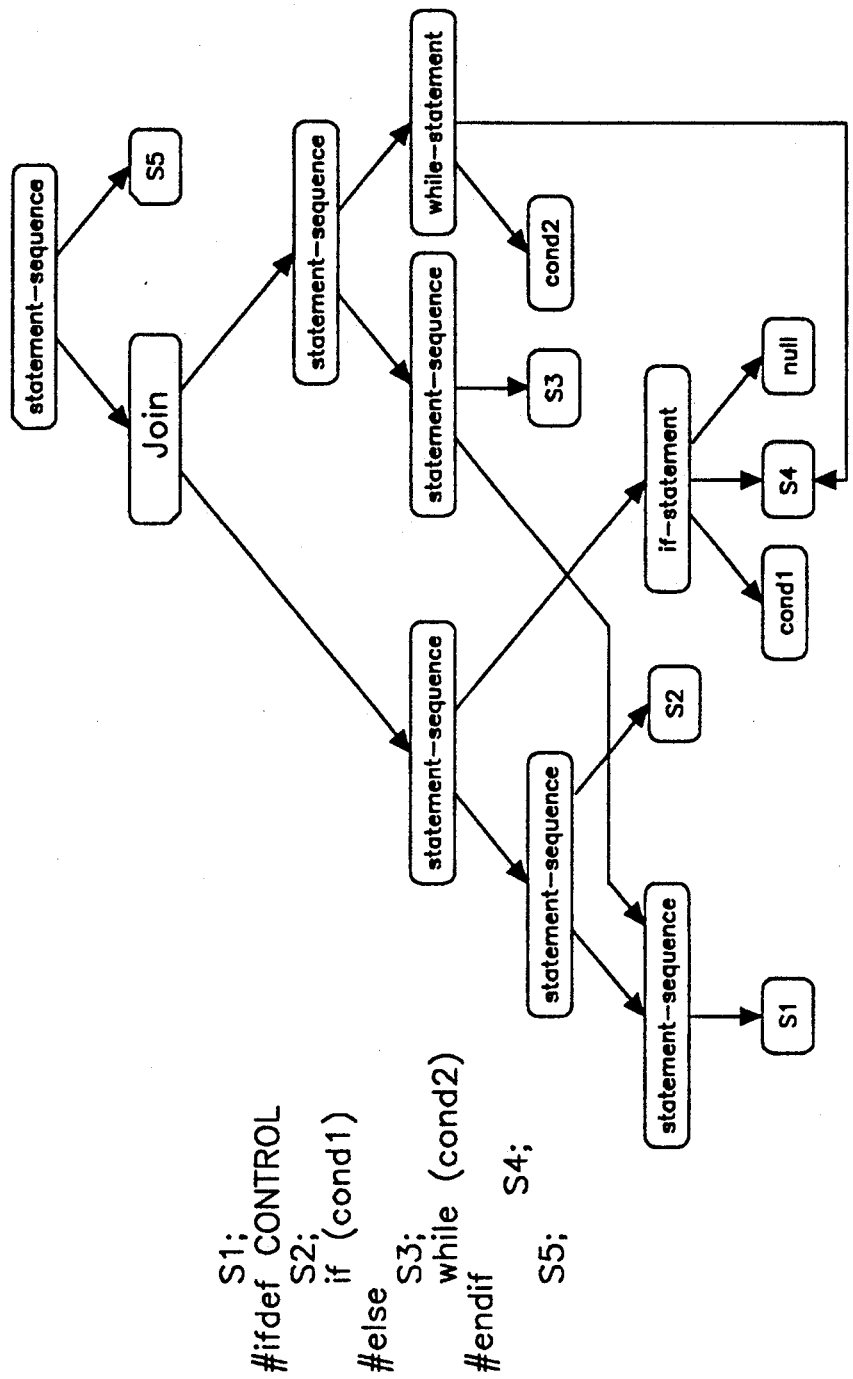
FIG. 2 illustrates an Abstract Syntax Graph corresponding to FIG. 1.
Figure 3:
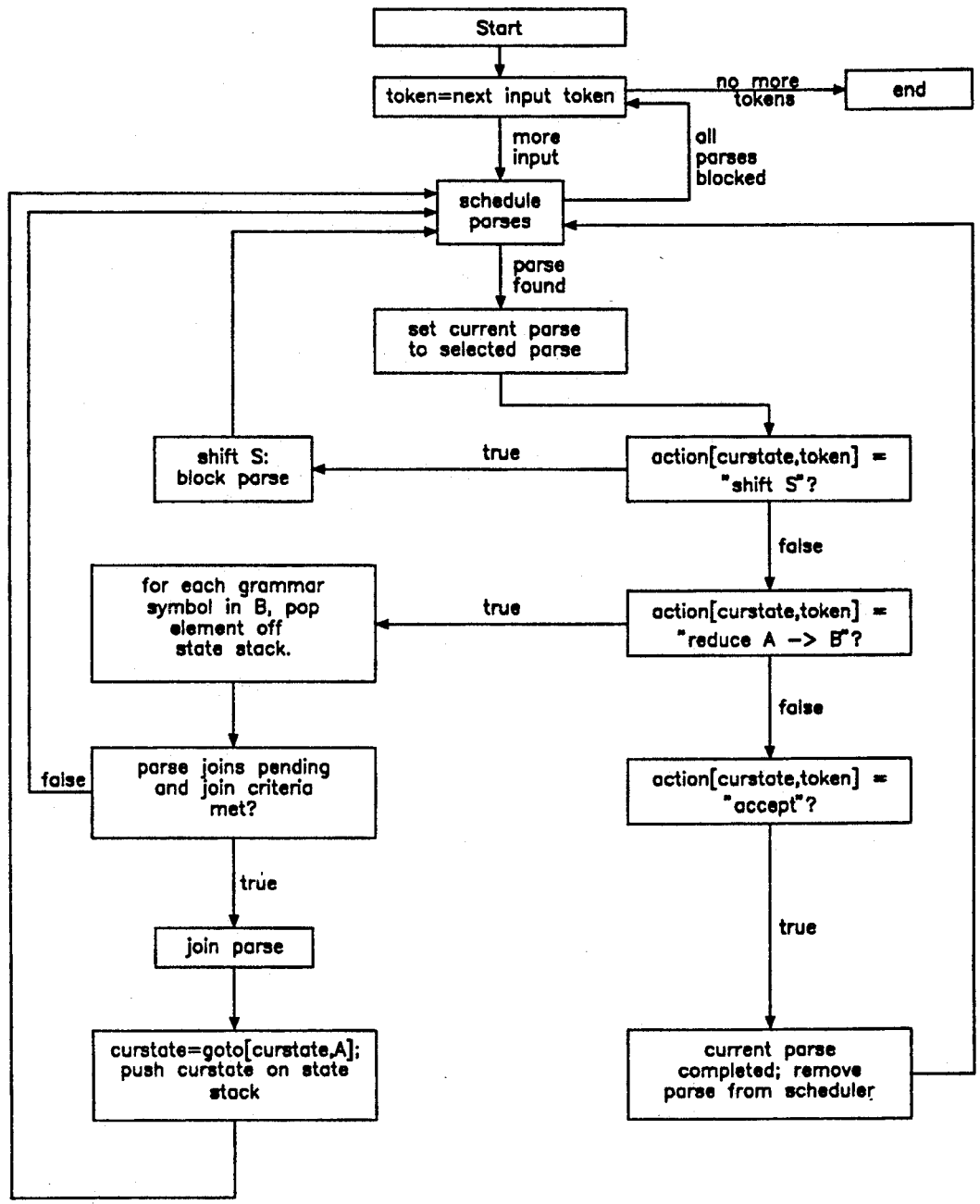
FIG. 3 illustrates a flow chart in accordance with the invention.

These problems and others arise because of the replication necessary when using a tree-based representation. This is solved in accordance with the present invention by using a representation based on graphs, herein called Abstract Syntax Graphs (ASG's). Instead of duplicating common subtrees, a single copy is referenced from multiple locations. FIG. 2 shows the ASG that would be generated for the program fragment in FIG. 1. Note that a join has been inserted that represents the point where the parses joined. The successors of this node represent each half of the #ifdef. The nodes for statement-sequence immediately above S1 and the statement S4 are common to both children. While a graph-based representation is more difficult to traverse, it accurately reflects the structure of the original program.

Generating this representation requires handling three problems.

1. The procedure must generate a join node and ensure that all nodes representing code that is conditionally compiled are successors of that node.
2. It must link references to nodes representing common code before a #ifdef to the original nodes.
3. It must do the same for nodes representing code after the #endif.

These problems are solved via the value stack. Each entry on the value stack is a pointer to a node in the ASG. When a reduction is done in a parse, a corresponding action routine is executed. This routine pops a number of entries from the value stack and creates a new node which contains the pointers that were popped. A pointer to this node is then pushed onto the value stack. This method is standard for LALR parsers.

Generating the join node at the proper point falls out of the criteria used in joining parses. The join node is created in the callback routine that is invoked when two parses are joined. The top entries on the value stacks of the two joined parses reference subgraphs which represent the code in the #if part and the #else part respectively. Everything below these entries was present at the time the parses were forked. Also, because the parses are in identical states at this point, the node types at the root of these subgraphs must be identical. Thus, these nodes can be replaced with a single join node which references them.

Linking references to nodes representing common code before a #ifdef also falls out from the parsing process. Since entries on the value stacks are only references to nodes in the ASG, not the nodes themselves, copying the value stack when a parse is forked does not actually create copies of any nodes. It only creates copies of references to the nodes. Thus when reductions take place in one of the forked parses, the nodes built contain the copied references, not copies of the nodes themselves.

Doing the same for nodes representing code after the #endif is much harder. The present parsing strategy does not support this. In order for it to do so, it would need to provide a communication path between the forked parses so they could check the states they are in and try to exchange information. Currently, this problem is not addressed. In effect, a graph is created where the #endif is pushed up to the join node in the ASG. Semantically, the graph generated captures all the information of the original program; however, a more space efficient representation is possible.

Another problem that arises when trying to include preprocessor information in the representation of C programs is what to do about macro invocations. It is desirable to represent both the pre-expansion and post-expansion versions of a macro in the ASG. This is not always possible because the result of invoking a macro is not required to be syntactically complete, i.e., it need not be representable by a subtree of the ASG. We have developed a compromise to solve this problem. Two alternatives are offered the user. In the first, the parts of the ASG that result from a macro expansion are marked, but there is no attempt to represent the unexpanded version of the macro. However, if the user guarantees that his code is free of syntactically incomplete macros, the same mechanism that is used for conditional compilation to represent both the expanded and unexpanded forms of macros is utilized. A separate parser, using the cpp grammar, generates a subtree for the unexpanded form. The main parser is forked and fed the expanded text. A ParseJoin is then signalled, which generates a join node with only one child. Next, the subtree that represents the unexpanded form of the macro is linked in. The join node is properly attributed to indicate that it is the result of a macro invocation, rather than conditional compilation.

The remaining features of the C preprocessor that are needed to represent, #include, #define, comments, etc., are handled by attributing the graph nodes. Since these features may occur at any arbitrary location in the program text, it is not feasible to represent them with nodes in the ASG. For reasons of space-efficiency, the present exemplary embodiments represents a choice not to expand and reparse text within a file indicated by a #include directive. Since the normal use of include files is for declarations, only the symbol table information associated with the include file is used.

While the invention has been described and explained by way of an exemplary embodiment, it will be apparent to one working in the field of the invention that various changes and modifications are possible without departing from the spirit of the invention. For example, the terminology applicable to a computer program has been variously employed in a convenient short-hand manner, but this is not to be construed to limit the invention to such language or terminology; it will be apparent to one skilled in the art to which the invention pertains to perform substitutions of equivalents which will not depart from the spirit of the invention. Such changes and modifications are intended to be within the scope of the invention, which is defined by the claims following.

What is claimed is:

1. A method utilizing a computer and using shift-reduce actions in an LR state machine for parsing a computer program text containing conditional compilation directives that induce multiple versions of a program from a single text source, said method comprising:

multiplexing and synchronizing a plurality of concurrently active parses reading from a common input stream;

forking a parse, hereinafter referred to as a new parse, when a conditional compilation directive appears in the input stream, indicating that an input immediately following said conditional compilation directive is one variant of a potential plurality of variants of the program, (said forking being hereinafter referred to as a ParseFork operation);

joining two previously forked parses when a predetermined set of join criteria is met, (said joining being hereinafter referred to as a ParseJoin operation); and scheduling the order of said shift-reduce actions in said LR state machine in said parses having been synchronized.

2. A method of parsing a program as recited in claim 1, wherein said method comprises:

exchanging a parse that is associated with one branch of said conditional compilation directive with a parse associated with another branch of said conditional compilation directive, (said exchanging being hereinafter referred to as a ParseExchange operation), said parse associated with said one branch being hereinafter referred to as an active parse and said parse associated with said another branch being referred to as a sleeping parse.

3. A method of parsing a program as recited in claim 2, wherein said forking a new parse when a conditional compilation directive appears in the input stream is performed by copying a current parse state and retaining that state for the purposes of executing more than one parse on the input stream and later determining when two parses are in a state to be joined together.

4. A method of parsing a program as recited in claim 3, wherein two previously forked parses are heuristically scheduled to undergo reductions to attempt to join two parses in a least possible number of shift-reduce actions.

5. A method of parsing a program as recited in claim 4, wherein each parse has a state stack and a value stack that are synchronized with each other and wherein if an appropriate #endif and said forked parses have equal state stacks and no values stored on value stacks will be lost as the result of a join, then said join criteria is met and, in that case, a join is made, with no loss of information resulting.

6. A method of parsing a program as recited in claim 5, wherein said procedures respectively comprise:
   i. on an occurrence of a new input token, get the next input token;
   ii. activate all parses that were blocked on input and make then available to process the new input token;
   iii. while there are parses available to act on said next input token,
      A. select a next available active parse for processing by performing:
      B. if action[CurState,token]=shift s, then push s on a state stack and block said next available active parse until all active parses have used said next available token;
      C. if action[CurState, token]=reduce A→$\beta$, then reduce A→$\beta$, where $\beta$ is a string comprising grammar symbols:
         1. for each grammar symbol in the string $\beta$, pop an element off of the state stack;
         2. if a parse join is pending and the two parses involved meet predetermined join criteria, then join the two parses;
         3. set CurState to Goto[CurState, A] and push CurState on the state-stack;
      D. if action[CurState, token]=accept, then said next available parse is complete.

7. A method of parsing a program as recited in claim 6, wherein said procedures respectively comprise:

E. if action[CurState, token]=error, then discard said next available parse.

8. A method of parsing a program as recited in claim 2, wherein said join criteria are defined such that, defining p and p' to be two forked parses, f and f' to be current pointers to a highest point in each of the two associated state stacks that the two parses have in common from when they were forked, and defining t and t' be current pointers to the top of the state stacks for the two parses, respectively, and if $s_1 s_2 \ldots s_f \ldots s_t$ be on state stack, $s'_1 s'_2 \ldots s'_{f'} \ldots s'_{t'}$, be the other state stack, then if the following criteria are met immediately following a reduction, then two parses can be joined:

the corresponding #endif has occurred in said input stream;
$f=f'$;
$s_{f+1}=s'_{f+1}$;
$t=f+1$; and
$t'=f'+1$.

9. A method of parsing a program as recited in claim 2, comprising the following operations:

ParseFork: fork said new parse when an #ifdef, #ifndef, or #if occurs in said input stream, wherein the fork operation copies an existing parser state, said parser state being defined to include a parser value and state stacks associated with said exixting parser states and wherein an input pointer is shared by all parses;

ParseJoin: join two previously forked parses when said join criteria are met.

ParseExchange: exchange two branches of a forked parse when a #else or #elif is encountered in said input stream, such that currently executing parses are put into a sleeping state and parses currently in a sleeping state on the #else or #elif are reactivated and scheduled to receive tokens, sleeping being defined as signifying that a parse has been put to sleep because it is not interested in the current token stream, this occurring when one branch of a conditional compilation directive is being processed and the other branch is waiting for the corresponding #else or #endif directive to be scheduled 10. A method of parsing a program as recited in claim 9, wherein each of said operations is associated with an application-specific callback routine that is invoked on each operation.

11. A method of parsing a program as recited in claim 10, comprising the following operations, each with an associated application specific callback routine:

ParseFork: fork a new parse when a #ifdef, #ifndef, or #if occurs in the token stream, wherein the fork operation copies the existing parser state, which includes the parser state and value stacks and wherein the input pointer is shared by all parses;

ParseJoin: is defined as an attempt to join two parses when an #endif is encountered in the token stream, such that when two branches of a parse cannot be immediately joined because the parses are not be in identical states, the parses are scheduled to be joined, and when parses are scheduled to be joined, multiple parses remain active (reading from a common input stream) until the parses can be joined, whereupon the callback routine is not actually invoked until the join occurs.

12. A method of parsing a program as recited in claim 6 comprising the following operations,:

ParseFork: fork a new parse when an #ifdef, #ifndef, or #if occurs in the token stream, wherein the fork operation copies the existing parser state, which includes the parser state stack and value stack and wherein the input pointer is shared by all parses;

ParseJoin: attempt to join two parses when an #endif is encountered in the token stream, such that when two parses cannot be immediately joined because the parses have not met the safe join criteria, parses are scheduled to be joined, and when parses are scheduled to be joined, multiple parses remain active, that is, reading from a common input stream, until parses can be joined;

ParseExchange: exchange two branches of a forked parse when a #else or #elif is encountered in the token stream, such that the currently executing parses are put to sleep and the parses currently sleeping on the #else or #elif are awakened and scheduled to receive tokens.

13. A method for parsing a program as recited in claim 12, wherein each of said operations has an associated application specific call-back routine.

14. A method of parsing a program as recited in claim 13, wherein a parse scheduler multiplexers an input stream of said program and determines which parse to run through said LR state machine.

15. A method of parsing a program as recited in claim 14, wherein the state of each parse is maintained in a schedule state variable.

16. A method of parsing a program as recited in claim 15, wherein said states comprise states defined as:

Active: signifying that the parse is allowed to receive the current token on the token input stream;

BlockedOnInput: signifying that the current token has already occurred and that the parse can perform no further work because other active parses are still waiting to process the current token; and Sleeping: signifying that a parse has been put to sleep because it is not interested in the current token stream, this occurring when one branch of a conditional compilation directive is being processed and the other branch is waiting for the corresponding #else or #endif directive to be schedule.

17. A method utilizing a computer for parsing a computer program, including a parse scheduler and an LR state machine, comprising the following steps:

create a parse and set it to a BlockedOnInput state, signifying that a current token has already occurred in an input stream and that the parse can perform no further work because other active parses are still waiting to process the current token;

while parses remain:

(a) if there are no active parses (i.e., the current token has occurred in the input stream), then read the next token and change all parses that are in the BlockedOnInput state to an Active state, signifying that a parse is allowed to receive the current token on the token input stream;

(b) while the current token is a preprocessor token:

i. if the current token is a #if, #ifdef, or #ifndef, then invoke a ParseFork operation, recording the current top of a state stack for each parse by pushing a pointer to the current top of the state stack onto a stack called the ForkPtrStack, then copying the parse and put copied parses in a Sleeping state, signifying that a parse has been put to sleep because it is not interested in the current token stream, this occurring when one branch of a conditional compilation directive is being processed and another branch is waiting for a corresponding #else or #endif directive to be scheduled;

ii. if the current token is a #else, then invoke a ParseExchange operation, putting to sleep activeparses and making active parses that are sleeping on this #else;

iii. if the current token is a #endif, then activate parses that are sleeping on this #endif, then attempt to invoke a ParseJoin operation to join two previously forked parses in accordance with safe join criteria which when met permit two parses to be joined and if two parses cannot be joined because they are in different configurations, then a scheduler notes that a join is pending and when a join is actually made, pop one value off of ForkPtrStack, and discard one of the two parses;

iv. get the next token; and (c) invoke a procedure from the parse scheduler to select active parse with a highest state stack that has been scheduled least recently and run the selected parse through one iteration of the LR state machine driver, comprising the steps of:

A. if action[CurState,token]=shift, then push s on the state stack and change the state from Active to BlockedOnInput;

B. if action[CurState, token]=reduce $A \rightarrow \beta$ then reduce $A \rightarrow \beta$, where $\beta$ is a string of grammar symbols:

(1) for each grammar symbol in the string $\beta$, pop an element off of the state stack, (2) if a join is pending and the height of the state stack is below the value stored at the top of the ForkPtrStack, update a pointer stored at the top of ForkPtrStack to reflect the current top of the state stack, (3) if a parse join is pending and two parses meet the joint criteria, then join the two parses and, once the join is made, pop the most recent value off of the ForkPtrStack, (4) set CurState to Goto[CurState,A] and push CurState on the state stack; and C. if action[CurState, token]=accept, then recognize parse is complete.

18. A method for parsing a program as recited in claim 17, wherein said ParseFork, ParseExchange and ParseJoin operations have respective associated application specific call-back routines.

19. A method of parsing a program as recited in claim 17, wherein each parse has a state stack and a value stack that are synchronized with each other and are used by action routines, and wherein said safe joint criteria are defined such that, if p and p' are defined to be two forked parses, f and f' are defined to be current pointers to a highest point in a state stack that the two parses have in common from when they were forked, if t and t' are defined to be a current pointers to the top of state stacks for the two parses, respectively, if $s_1 s_2 \ldots s_f \ldots s_t$ be defined as one state stack, $s'_1 s'_2 \ldots s'_f \ldots s'_{t'}$ be defined as the other state stack, then if the following set of criteria is met immediately following a reduction, then two parses can be joined:

1. The corresponding #endif has occurred in the input stream,
2. $f = f'$,
3. $s_{f+1} = s'_{f+1}$,
4. $t = f + 1$,
   $t' = f' + 1$,

20. A method for parsing a computer program containing conditional compilation directives that induce plural versions of a program from a single text source, comprising:

multiplexing and synchronizing two concurrently active parse procedures reading from a common input stream;

forking a parse, hereinafter referred to as a new parse, to correspond to an occurrence of a conditional compilation directive;

exchanging a parse associated with one branch of said conditional compilation directive with a parse associated with the other branch path of said conditional compilation directive;

join two previously forked parses when predetermined join criteria are met.

21. A method for parsing computer program test in accordance with claim 20, comprising the step of scheduling an order of shift-reduce actions in said input-synchronized parses.

* * * * *